United States Patent
Lange et al.

(10) Patent No.: US 9,322,302 B2
(45) Date of Patent: Apr. 26, 2016

(54) OPERATING INTERNAL COMBUSTION ENGINES

(71) Applicant: Caterpillar Motoren GmbH & Co. KG, Kiel (DE)

(72) Inventors: Hendrik Johannes Lange, Kiel (DE); Andreas Banck, Altenholz (DE); Markus Krueger, Weede (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 83 days.

(21) Appl. No.: 14/446,356

(22) Filed: Jul. 30, 2014

(65) Prior Publication Data

US 2015/0047587 A1 Feb. 19, 2015

(30) Foreign Application Priority Data

Aug. 13, 2013 (EP) .................................. 13180236

(51) Int. Cl.

| *F01L 1/34* | (2006.01) |
| --- | --- |
| *F01L 1/344* | (2006.01) |
| *F02D 13/02* | (2006.01) |
| *F02D 41/00* | (2006.01) |
| *F01L 1/14* | (2006.01) |
| *F02M 39/02* | (2006.01) |
| *F02M 59/10* | (2006.01) |
| *F02D 1/16* | (2006.01) |
| *F01L 13/00* | (2006.01) |
| *F01L 1/047* | (2006.01) |

(52) U.S. Cl.
CPC .................. *F01L 1/344* (2013.01); *F01L 1/146* (2013.01); *F01L 13/0063* (2013.01); *F02D 1/16* (2013.01); *F02D 13/0238* (2013.01); *F02D 13/0269* (2013.01); *F02D 41/0002* (2013.01); *F02M 39/02* (2013.01); *F02M 59/102* (2013.01); *F01L 2001/054* (2013.01); *F01L 2013/103* (2013.01); *F01L 2013/105* (2013.01); *F01L 2013/106* (2013.01); *F01L 2105/02* (2013.01); *F01L 2820/01* (2013.01); *F02D 2001/165* (2013.01)

(58) Field of Classification Search
CPC ............... F01L 1/344; F01L 2001/054; F02D 13/0269; F02D 41/002; F02D 2001/165
USPC ............................................ 123/90.15, 90.17
See application file for complete search history.

(56) References Cited

U.S. PATENT DOCUMENTS

| 8,006,658 | B2 * | 8/2011 | Nakamura | .......... | F01L 13/0026 123/90.16 |
| --- | --- | --- | --- | --- | --- |
| 2005/0229901 | A1 | 10/2005 | Weber et al. | | |

FOREIGN PATENT DOCUMENTS

| EP | 0 999 357 A2 | 5/2000 |
| --- | --- | --- |
| EP | 1 515 025 A1 | 3/2005 |

(Continued)

OTHER PUBLICATIONS

European Search Report dated Jan. 15, 2014.

*Primary Examiner* — Ching Chang

(57) ABSTRACT

A control system is disclosed for operating an internal combustion engine. The control system includes a control unit configured for providing a part load mode that is optimized for slow operation of the engine at loads up to an upper part load limit in the range from 40% to 75% of a maximum engine load. The control unit is also configured for providing a high load mode for engine loads above the upper part load limit. In the part load mode, at least one inlet valve is closed at a closing angle later than in the high load mode.

20 Claims, 3 Drawing Sheets

(56) References Cited

FOREIGN PATENT DOCUMENTS

| EP | 2 136 054 A1 | 12/2009 |
| EP | 2 677 142 A1 | 12/2013 |
| EP | 2 752 561 A1 | 7/2014 |
| EP | 2 752 571 A1 | 7/2014 |

* cited by examiner

OPERATING INTERNAL COMBUSTION ENGINES

TECHNICAL FIELD

The present disclosure generally relates to a method and device for operating an internal combustion engine, and more particularly to a method and device that is optimized for slow steaming in marine applications of internal combustion engines.

BACKGROUND

Various systems for adjusting the opening and closing of inlet valves and outlet valves are known in the field of variable valve timing technologies. Most systems aim to adjust actuation timings of cam actuated components in an internal combustion engine. Often, those variable valve timing systems facilitate a so-called cam-phasing where a rotational angle of a camshaft is rotated forwards or backwards relative to a crankshaft to advance or delay an actuation timing of an associated component.

EP 2 136 054 A1 shows a device for controlling the operation of an internal combustion engine. At stationary operation, the diesel engine is operated at a load greater than 25% of the full load with two valve lifting curves in a miller cycle. At loads below 25% of the full load, the internal combustion engine is operated with two different valve lifting curves. This technology is also known as flexible camshaft technology (FCT).

Some systems may include a common rail providing high pressure fuel to fuel injectors, which may be solenoid-, or piezo-actuated.

The present disclosure is directed, at least in part, to improving or overcoming one or more aspects of prior systems.

SUMMARY OF THE DISCLOSURE

According to an aspect of the present disclosure, a control system for operating an internal combustion engine is disclosed. The internal combustion engine may comprise at least one cylinder unit with at least one inlet valve. The control system may comprise a control unit configured to provide a part load mode optimized for part load (such as loads that are used in marine applications for slow steaming) and configured for an engine load up to an upper part load limit, which is set in in the range from 40% to 75% of a maximum engine load, wherein the at least one inlet valve is closed at an inlet valve part load closing angle. The control unit may be further configured to provide a high load mode configured for an engine load above the upper part load limit, wherein the at least one inlet valve is closed at an inlet valve high load closing angle. The inlet valve high load closing angle may be earlier than the inlet valve part load closing angle in a range from 5° to 25°.

According to another aspect of the present disclosure, a method for operating an internal combustion engine comprising at least one cylinder unit with at least one inlet valve is disclosed. The method may comprise operating the internal combustion engine in a part load mode at an engine load up to an upper part load limit in the range from 40% to 75% of a maximum engine load, wherein the at least one inlet valve is closed at an inlet valve part load closing angle. The method may further comprise operating the internal combustion engine in a high load mode at an engine load above the upper part load limit, wherein the at least one inlet valve is closed at an inlet valve high load closing angle earlier than the inlet valve part load closing angle (by an angle difference) in a range from 5° to 25°.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
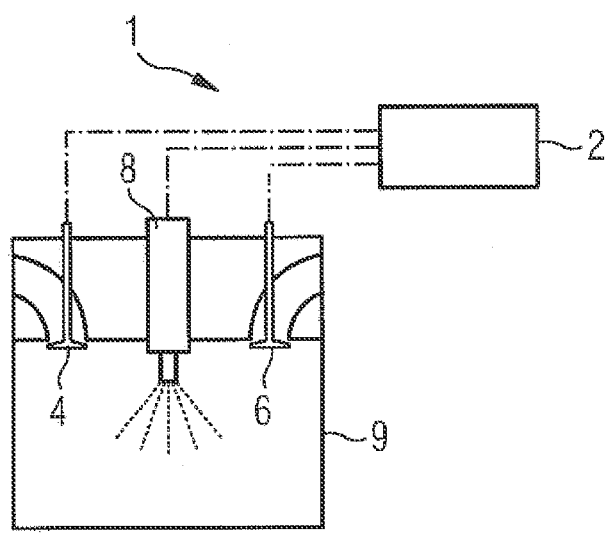
FIG. 1 shows a schematic diagram of a cylinder unit and a control system according to the present disclosure.

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that large internal combustion engines on ships and marine vessels are often operated in part load during so called slow steaming. Slow steaming reduces fuel costs and, thereby, decreases the impact on the environment. In general, slow steaming is understood as operating engines in marine applications at a load well below maximum load, for example, between 40% and 80% of a maximum engine load. As most engines are particularly optimized for a high load operation, operation in part load when slow steaming includes untapped potentials in terms of engine efficiency and, therefore, fuel consumption.

Herein, a method and control system for operating an internal combustion engine is disclosed which allows an optimized operation of the internal combustion engine during slow steaming. Specifically, the exemplary method and device as disclosed herein provide an operation mode for valve actuation and fuel injection that is optimized for part load operation.

Referring to FIG. 1, a control system 1 is depicted schematically for an internal combustion engine. Control system 1 includes a control unit 2 which is configured to control at least one inlet valve 4, at least one outlet valve 6, and/or at least one fuel injector 8 of at least one cylinder unit 9 of the internal combustion engine.

The internal combustion engine including control system 1 may include features not shown, such as air systems, cooling systems, peripheries, drivetrain components, etc. Furthermore, the internal combustion engine may be of any size, with any number of cylinders, and in any configuration (for example, "V," in-line, radial, etc.). Additionally, the internal combustion engine may be used to power any machine or other device, including, but not limited to, marine applications, locomotive applications, on-highway trucks or vehicles, off-highway trucks or machines, earth moving equipment, generators, aerospace applications, offshore applications, pumps, stationary equipment, or other engine powered applications. The internal combustion engine may be powered with diesel fuel, heavy fuel oil, and/or the like.

As noted above, control unit 2 controls operation of inlet valve 4, outlet valve 6, and/or fuel injector 8. Control over those elements may be performed by any conceivable mechanism know in the art that is capable of actuating the element as desired. For example, at least one of inlet valve 4, outlet valve 6, and fuel injector 8 may be directly or indirectly mechanically actuated by at least one camshaft drivingly rotated by a crankshaft. In another example, at least one of inlet valve 4, outlet valve 6, and fuel injector 8 may be actuated by a solenoid, or a piezo element. In those configurations, control unit 2 controls operation by energizing and de-energizing the solenoid and the piezo element, respectively.

To operate the internal combustion engine, control unit 2 provides a part load mode and a high load mode. The part load mode, and in particular its control parameter settings, is used at engine loads up to an upper part load limit. The upper part load limit may be set in the range from 40% to 75% of a maximum engine load, for example 45%, 50%, 65%, and 70%. Accordingly, the high load mode is used at engine loads above the set upper part load limit.

Figure 2:
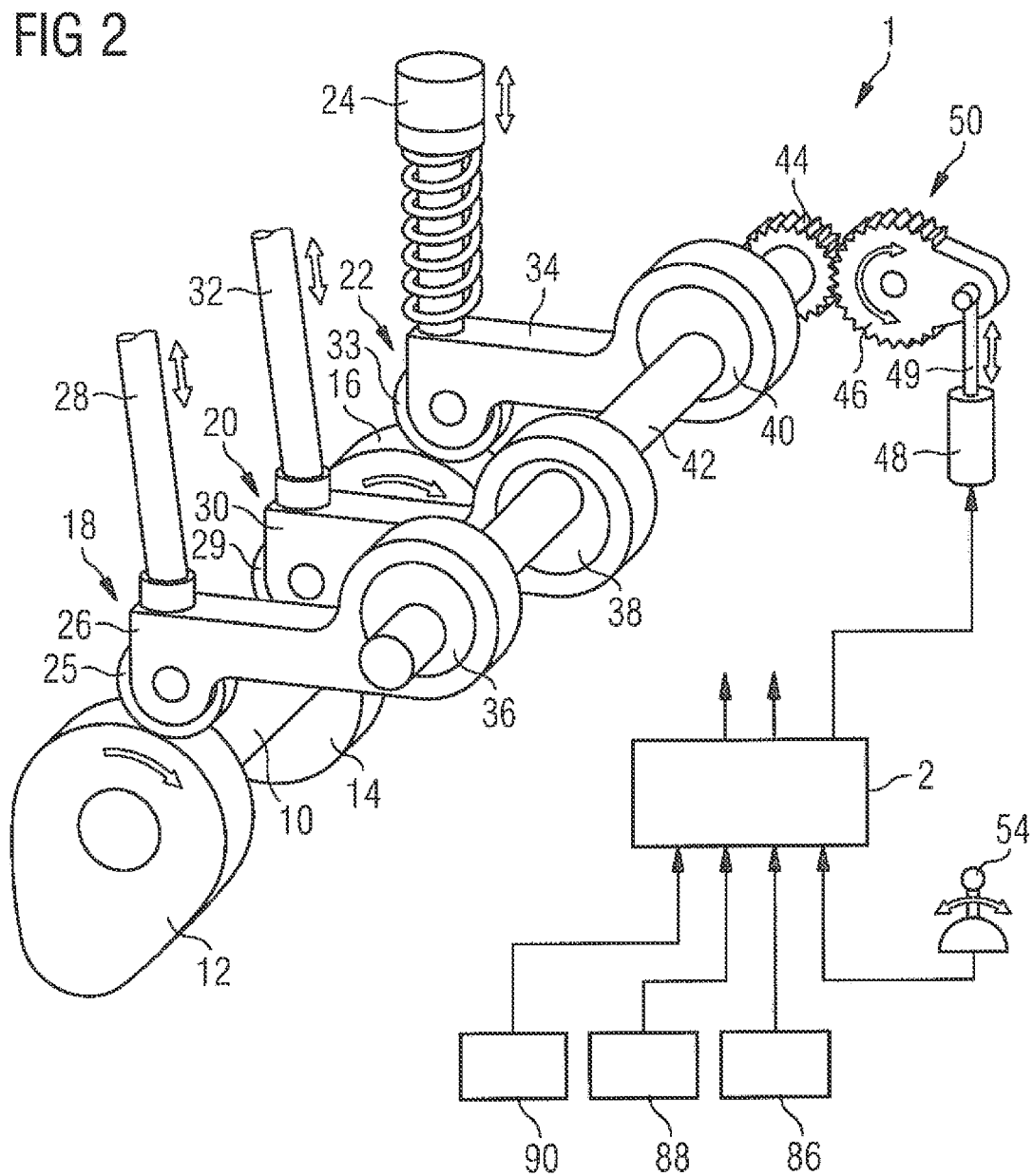
FIG. 2 shows a schematic diagram of an exemplary device for controlling the operation of an internal combustion engine according to the present disclosure.

According to FIG. 2, control system 1 may be adapted for use with flexible cam technology. A camshaft 10 may be formed integrally with several cams, for example, an inlet cam 12, an outlet cam 14 and a pump cam 16.

Inlet cam 12 is adapted to operate inlet valve 4 (see FIG. 1) that is arranged in an inlet of a combustion chamber of cylinder unit 9 of the internal combustion engine and that is operated via, for example, an inlet valve operating arrangement 18. In a similar manner, outlet cam 14 is adapted to operate outlet valve 6 (see FIG. 1) arranged in an outlet of a combustion chamber of cylinder unit 9 of the internal combustion engine via, for example, an outlet valve operating arrangement 20. Pump cam 16 is adapted to operate a pump piston 24 arranged in an injection pump via, for example, a pump operating arrangement 22. Said injection pump is fluidly connected with fuel injector 8 (see FIG. 1) to supply fuel to the same if actuated.

Inlet valve operating arrangement 18 comprises an inlet valve operating lever 26 formed, for example, as an oscillating arm, which is adapted to trace the stroke of inlet cam 12 via, for example, a roll 25 supported thereon. The stroke is transmitted to inlet valve 4 via, for example, an inlet valve operating lifter 28 in order to operate said inlet valve 4.

Similarly, outlet valve operating arrangement 20 is provided with an outlet valve operating lever 30, which is adapted to trace the stroke of outlet cam 14 via, for example, a roll 29 supported thereon and transmit the same to an outlet valve operating lifter 32.

The stroke of pump cam 16 may be traced by, for example, a roll 33 arranged at the end of a pump operating lever 34 and may be transmitted to pump piston 24.

At the ends facing away from tracing rolls 25, 29, 33, operating levers 26, 30 and 34 are supported on eccentric disks 36, 38 and 40, which are preferably formed integrally with a rotatable shaft 42 that may be supported on an engine housing (not shown). The eccentricities of the preferably circular cylindrical circumferential surfaces of eccentric disks 36, 38, 40 relative to the axis of shaft 42, as well as the relative positions of the eccentricities relative to the rotational position of shaft 42 may be selected individually according to the respective requirements outlined herein.

In order to adjust the rotational position of shaft 42, shaft 42 may be connected, for example torsionally stiff, to a gearwheel 44 or any other applicable element meshing with, for example, teeth of a segmental gearwheel 46, whose rotational position may be adjustable via, for example, an actuator 48 including an actuator rod 49. Actuator 48 together with segmental gearwheel 46 and gearwheel 44 may form an adjusting device 50. A hydraulic or pneumatic cylinder may be used as a longitudinally adjustable element. In other embodiments, a linear motor or any other suitable element may be adapted to rotate shaft 42 in an appropriate manner.

Exemplary control unit 2 is provided for controlling actuator 48. Control unit 2 preferably comprises a microprocessor with appropriate program and data memories and includes several outputs, at least one of said outputs being connected to actuator 48. Control unit 2 is preferably provided with several inputs, one of said inputs being connected with, for example, an operating element 54 for adjusting, for example, the load of the internal combustion engine or the operating mode of the same.

A plurality of cylinder pressure sensors 86 for detecting the cylinder pressure in the cylinders of the internal combustion engine, and a speed sensor 88 for detecting the rotational speed of the crankshaft of the internal combustion engine may also be connected to further inputs of control unit 2. A load sensor 90 for detecting the required load and its change may also be connected to a further input of control unit 2.

In some embodiments, separate camshafts for actuating inlet valves and outlet valves may be provided.

Again, it is noted that FIG. 2 only indicates an exemplary embodiment of control system 1. Various additional or alternative elements may be part of control system 1 to facilitate controlling inlet valve 4, outlet valve 6, and/or fuel injector 8. For example, a common rail may be provided which supplies high pressure fuel to a fuel injector which injects fuel upon actuation.

INDUSTRIAL APPLICABILITY

In the following, operation of control system 1 controlling operation of the internal combustion engine in the part load mode and the high load mode is described with reference to FIGS. 1 to 3

Figure 3:
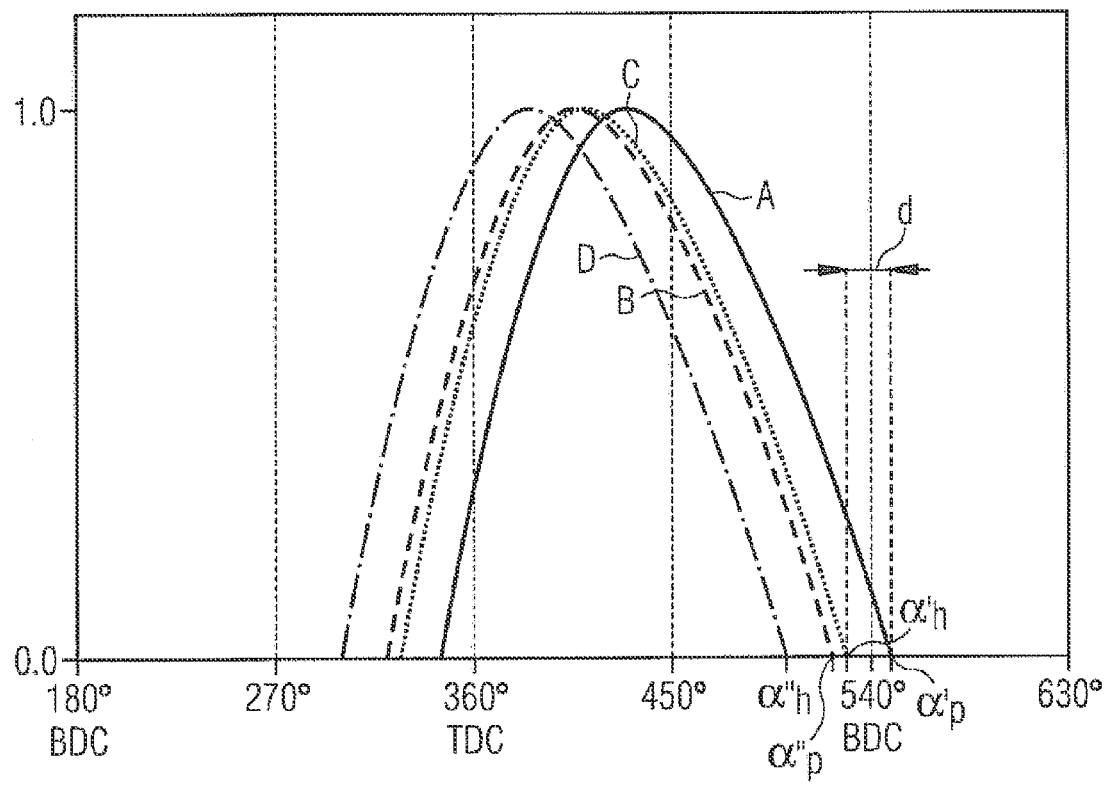
FIG. 3 shows a diagram representing exemplary inlet valve timings according to a high load mode and a part load mode as adjusted, for example, by the control system of FIG. 1.

FIG. 3 shows a diagram indicating a valve lift in dependence on a crank angle. A valve is fully opened at a valve lift of 1.0, whereas a valve is fully closed at a valve lift of 0.0. As one skilled in the art will appreciate, crank angles of 0° (not shown in FIG. 3) and 360° are associated with a piston at top dead center (TDC), and crank angles of 180° and 540° are associated with the piston at bottom dead center (BDC). In the following, valve lifting curves are described with reference to TDC and BDC. For example, a certain position may be 10° before top dead center (BTDC), or 15° after bottom dead center (ABDC).

It should be appreciated that the shown valve actuation timings for the high load mode and the part load mode are only exemplary and may be modified within certain boundaries which may be influenced by, for example, engine size, engine power output, and engine speed. Accordingly, particular attention should be drawn on different value ranges between the part load mode and the high load mode for certain angles described in the following. In addition, also the shape of the curves is only exemplarily and depends, for example, on the underlying mechanical system.

Specifically, a valve lifting curve A (indicated by a solid line in FIG. 3) and a valve lifting curve B (indicated by a dashed line in FIG. 3) define a range in which inlet valve 4 (see FIG. 1) is actuated in the part load mode. A valve lifting curve C (indicated by a dotted line in FIG. 3) and a valve lifting curve D (indicated by a dashed dotted line in FIG. 3) define a range in which inlet valve 4 is actuated in the high load mode. According to curve A, inlet valve 4 is fully closed at about 10° ABDC, which may be an upper limit for an inlet valve part load closing angle ($\alpha_p'$). At curve B, a lower limit for the part load closing angle ($\alpha_p''$) of inlet valve 4 is at about 15° BBDC. For the high load mode, an upper limit for the high load closing angle ($\alpha_h'$) at which inlet valve 4 is fully closed is at about 10° BBDC, which can be seen at curve C, and a lower limit for the high load closing angle ($\alpha_h''$) is at about 35° BBDC, which is indicated by curve D.

In general, the curves may vary in their angular position depending on engine speed, piston stroke and mean piston speed.

Exemplary, FIG. 3 shows a difference d between an exemplary high load closing angle ($\alpha_h$) and an exemplary part load closing angle ($\alpha_p$) for a medium size internal combustion engine. Difference d indicates that the high load closing angle ($\alpha_h$) is earlier than the part load closing angle ($\alpha_p$). The high load closing angle ($\alpha_h$) is in a range from, for example, 5° to 25° earlier, for example, 20° as depicted in FIG. 3. As a general rule, difference d is set higher with decreasing upper part load limit, which constitutes the transition point for transitioning from the part load mode to the high load mode, and vice versa. The reason is that for upper part load limits, which are set relatively low, the part load mode is optimized for lower part loads, for example, within a range from 25% to 50% of a maximum engine load. This is comparably far from an engine operating point, which is optimized for the high load mode. For upper part load limits, which are set relatively high, the part load mode is optimized for higher part loads. For example, a range from 40% to 75% of a maximum engine load is comparably close to an engine operating point which is optimized for the high load mode.

Moreover, the earlier inlet valve 4 is closed during the intake stroke, the more distinct a so-called miller cycle is performed. As one skilled in the art will appreciate, the miller cycle comes along with various effects such as, for example, higher geometric compression, reduced combustion peak temperatures, reduced knocking, and more efficient fuel combustion. Reduced combustion peak temperatures may particularly reduce the amount of generated NOx. On the other hand, particularly in the part load mode, the internal combustion engine is operated merely in a less distinct miller cycle if at all. In embodiments in which the inlet valve is closed shortly after bottom dead center in the part load mode, the internal combustion engine operates in a less distinct so-called atkinson cycle whose effects are similar to those of a less distinct miller cycle. As the terminology already indicates, in a less distinct miller cycle as well as in a less distinct atkinson cycle, the above noted effects of a distinct miller cycle occur less distinct.

The high load mode and the part load mode also differ from one another in terms of fuel injection timing. To assure a smoke-free combustion in the part load mode, an earlier injection timing is used than in the high load mode. Specifically, a part load injection timing is performed earlier than a high load injection timing with, for example, a difference in injection timing in a range from 2° to 6°. For example, if fuel is injected within a range from 15° BTDC as a lower limit to 2° BTDC (or 5° BTDC) as an upper limit in the part load mode, fuel may be injected within a range from 13° BTDC to 3° BTDC in the high load mode.

In a similar manner as inlet valve 4, outlet valve 6 is actuated differently in the part load mode and the high load mode. Specifically, in the part load mode, outlet valve 6 closes at a part load outlet valve closing angle which is earlier than a high load outlet valve closing angle.

In an exemplary embodiment, the control system 1 shown in FIG. 2 is configured to control the internal combustion engine, particularly inlet valve 4, outlet valve 6 and fuel injector 8 in accordance with the methods disclosed herein. Specifically, adjusting device 50 is configured to adjust the rotational angle of shaft 42 to at least a first angle position and a second angle position different from the first angle position. The first angle position is associated with the high load mode and the second angle position is associated with the part load mode.

The herein disclosed association of operating angles for the inlet valves and/or outlet valves and/or the fuel injection allow providing a part load mode optimized for slow steaming in addition to the maximum output load optimized high load mode.

This allows in particular for marine applications steaming at maximum power output or at part load optimized power output. The latter being applied, for example, if travel speed is less important or emission regulation can be better fulfilled.

Although the preferred embodiments of this disclosure have been described herein, improvements and modifications may be incorporated without departing from the scope of the following claims.

The invention claimed is:

1. A control system for operating an internal combustion engine comprising at least one cylinder unit with at least one inlet valve, the control system comprising:
   a control unit configured to
      provide a part load mode optimized for part load operation and configured for an engine load up to an upper part load limit, which is set in the range from 40% to 75% of a maximum engine load, wherein the at least one inlet valve is closed at an inlet valve part load closing angle ($\alpha_p$); and
      provide a high load mode configured for an engine load above the upper part load limit, wherein the at least one inlet valve is closed at an inlet valve high load closing angle ($\alpha_h$);
      wherein the inlet valve high load closing angle ($\alpha_h$) is in a range from 5° to 25° earlier than the inlet valve part load closing angle ($\alpha_p$).

2. The control system of claim 1, wherein the inlet valve part load closing angle ($\alpha_p$) is in a range from 15° before bottom dead center (BDC) as a lower limit to 10° after bottom dead center (BDC) as an upper limit.

3. The control system of claim 1, wherein,
   in the high load mode, fuel is injected during a high load mode injection timing; and
   in the part load mode, fuel is injected during a part load injection timing in a range from 2° to 6° earlier than the high load injection timing.

4. The control system of claim 1, wherein, in the part load mode, fuel is injected within a range from 15° before top dead center (TDC) as a lower limit to 2° before top dead center (TDC) as an upper limit.

5. The control system of claim 1, wherein the high load closing angle ($\alpha_h$) is in a range from 35° before BDC to 10° before BDC.

6. The control system of claim 1, wherein, in the high load mode, fuel is injected in a range from 13° before top dead center (TDC) as a lower limit to 3° before top dead center (TDC) as an upper limit.

7. The control system of claim 1, further comprising:
a shaft rotationally supported and being provided with a first eccentric, the first eccentric being configured to support an inlet valve operating lever for controlling the inlet valve; and
an adjusting device configured to adjust the rotational angle of the shaft to at least a first angle position and a second angle position different from the first angle position, the first angle position being associated with the high load mode and the second angle position being associated with the part load mode, wherein
the first eccentric is designed and arranged on the shaft such that, in the first angle position, the associated inlet valve closes at the high load inlet valve closing angle, and, in the second angle position, the associated inlet valve closes at the part load inlet valve closing angle.

8. The control system of claim 7, wherein the shaft is further provided with a second eccentric configured to support an outlet valve operating lever for controlling an outlet valve, the second eccentric being designed and arranged on the shaft such that, in the first angle position, the associated outlet valve closes at a high load outlet valve closing angle, and, in the second angle position, the associated outlet valve closes at a part load outlet valve closing angle earlier than the high load outlet valve closing angle.

9. The control system of claim 8, wherein the shaft is further provided with a third eccentric configured to support a fuel pump operating lever for controlling a fuel injector, the third eccentric being designed and arranged on the shaft such that, in the first angle position, the associated fuel injector is controlled such that fuel is injected during a high load injection timing, and, in the second angle position, the associated fuel pump is controlled such that fuel is injected during a part load injection timing earlier than the high load injection timing.

10. A method for operating an internal combustion engine comprising at least one cylinder unit with at least one inlet valve, the method comprising:
operating the internal combustion engine in a part load mode at an engine load up to an upper part load limit in the range from 40% to 75% of a maximum engine load, wherein the at least one inlet valve is closed at an inlet valve part load closing angle; and
operating the internal combustion engine in a high load mode at an engine load above the upper part load limit, wherein the at least one inlet valve is closed at an inlet valve high load closing angle in a range from 5° to 25° earlier than the inlet valve part load closing angle.

11. The method of claim 10, wherein the part load closing angle is in a range from 15° before bottom dead center (BDC) as a lower limit to 10° after bottom dead center (BDC) as an upper limit.

12. The method of claim 10, wherein,
in the high load mode, fuel is injected during a high load mode injection timing; and
in the part load mode, fuel is injected during a part load injection timing in a range from 2° to 6° earlier than the high load injection timing.

13. The method of claim 12, wherein, in the part load mode, fuel is injected within a range from 15° before top dead center (TDC) as a lower limit to 2° before top dead center (TDC) as an upper limit.

14. The method of claim 10, wherein, in the part load mode, fuel is injected within a range from 15° before top dead center (TDC) as a lower limit to 2° before top dead center (TDC) as an upper limit.

15. The method of claim 11, wherein,
in the high load mode, fuel is injected during a high load mode injection timing; and
in the part load mode, fuel is injected during a part load injection timing in a range from 2° to 6° earlier than the high load injection timing.

16. The method of claim 11, wherein, in the part load mode, fuel is injected within a range from 15° before top dead center (TDC) as a lower limit to 2° before top dead center (TDC) as an upper limit.

17. An internal combustion engine, comprising:
at least one cylinder unit;
at least one inlet valve associated with each of the at least one cylinder units; and
a control unit configured to:
provide a part load mode optimized for part load operation and configured for an engine load up to an upper part load limit, which is set in the range from 40% to 75% of a maximum load for the internal combustion engine, wherein the at least one inlet valve is closed at an inlet valve part load closing angle ($\alpha_p$); and
provide a high load mode configured for an engine load above the upper part load limit, wherein the at least one inlet valve is closed at an inlet valve high load closing angle ($\alpha_h$), wherein the inlet valve high load closing angle ($\alpha_h$) is in a range from 5° to 25° earlier than the inlet valve part load closing angle ($\alpha_p$).

18. The internal combustion engine of claim 17, wherein the inlet valve part load closing angle ($\alpha_p$) is in a range from 15° before bottom dead center (BDC) as a lower limit to 10° after bottom dead center (BDC) as an upper limit.

19. The internal combustion engine of claim 17, wherein,
in the high load mode, fuel is injected during a high load mode injection timing; and
in the part load mode, fuel is injected during a part load injection timing in a range from 2° to 6° earlier than the high load injection timing.

20. The internal combustion engine of claim 17, wherein, in the part load mode, fuel is injected within a range from 15° before top dead center (TDC) as a lower limit to 2° before top dead center (TDC) as an upper limit.

* * * * *